Dec. 14, 1943.　　　　E. E. WEMP　　　　2,336,973
CENTRIFUGAL HEAD PRESSURE DEVICE
Filed Oct. 21, 1939　　　2 Sheets-Sheet 1

INVENTOR.
Ernest E. Wemp
BY
ATTORNEYS

Dec. 14, 1943.  E. E. WEMP  2,336,973
CENTRIFUGAL HEAD PRESSURE DEVICE
Filed Oct. 21, 1939   2 Sheets-Sheet 2

INVENTOR.
Ernest E. Wemp
BY
ATTORNEYS

Patented Dec. 14, 1943

2,336,973

UNITED STATES PATENT OFFICE 2,336,973

CENTRIFUGAL HEAD PRESSURE DEVICE

Ernest E. Wemp, Detroit, Mich.

Application October 21, 1939, Serial No. 300,604

8 Claims. (Cl. 74—574)

This invention relates to a centrifugal head pressure mechanism. More specifically, the invention is directed toward the provision of a mechanism which employs the centrifugal head of a rotating body or mass of material which is capable of flowing. Where a device or mechanism of this type employs a fluid, such for example, as water or oil, it is difficult and expensive to seal the liquid against leakage, particularly against the pressures which are developed. The present invention contemplates, in a device of this type, the use of a medium or body which, while substantially following the laws of fluid centrifugal head, requires no sealing against leakage.

To this end, a body or mass of divided solid material is employed, and advantageously, the individual particles or elements may be of substantially the same size and are preferably of symmetrical form. This body or mass of material, as specifically shown herein, may comprise balls or shot, or a mass of substantially spherical elements.

In carrying out the invention a mass of the balls or shot is confined within a chamber in a rotating mechanism, and in the rotation thereof a centrifugal head develops. It has been found that an arrangement of this kind substantially follows the law of fluid centrifugal head, as distinguished from centrifugal force. The pressure or force developed incident to rotation is in a radial direction and the invention provides an arrangement for changing the direction, to the end that the forces may be directed substantially axially, and thus employed as desired. The centrifugal head varies with the R. P. M., and accordingly, the varying pressure may be put to use in a number of ways. For lack of a better term, the body or mass of material may be called a mechanical fluid. The material requires no sealing against leakage, offers no difficulty as to balancing, and approaches the efficiency of a true liquid. The body or mass of material may also be called a macro-molecular fluid, and more specifically, an incompressible macro-molecular fluid, the constituent elements, namely, the balls or particles of divided solid material being visible to the naked eye. The elements of the substance are preferably of a metallic nature, solid at ordinary temperatures, of high specific gravity, and substantially spherical in form. Due to the high unit pressures developed in the mechanism, the elements should have a high surface hardness and be highly resistant to compression or breakage. Metal balls or shot are probably the best examples of material answering these requirements, and steel balls or shot in particular have the added advantage that they can be produced commercially at a low cost per unit weight.

The accompanying drawings illustrate two different forms of mechanism in which the invention may be employed, and in the drawings Fig. 1 is a cross sectional view of a vibration dampener.

Figure 1:
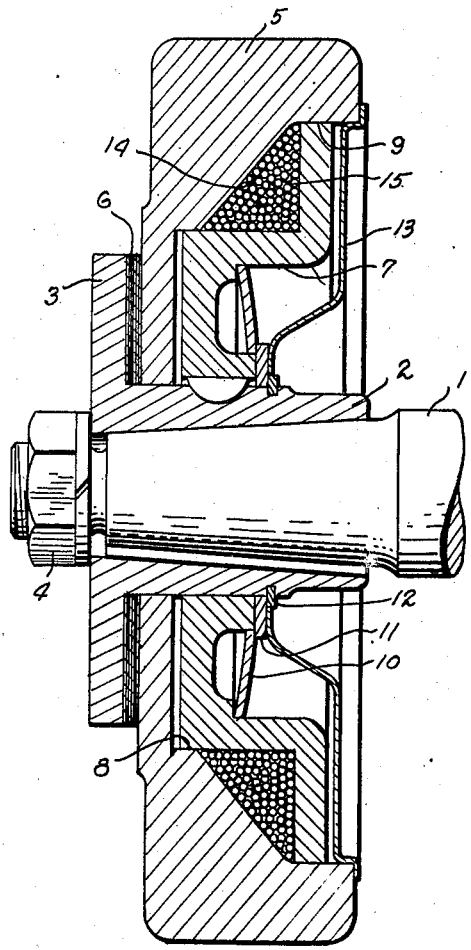

In Fig. 1 a shaft, such as the end of the crankshaft of an internal combustion engine, is illustrated at 1, and keyed to the shaft is a hub element 2 provided with a flange 3 and held tightly to the shaft by a nut 4. Rotatably mounted on the hub is a weight or mass member 5. Between the members 3 and 5 is friction material 6.

The member 5 is formed to provide a cavity in the nature of a cylinder; and a piston-like element 7, which is slidably keyed to the hub 2, fits within the cylindrical formation as indicated at 8. The member 7 is formed with an L-shaped arrangement in cross section, and it fits within a section of the member 5 of larger diameter as at 9, the interfitting surfaces at 8 and 9 having requisite clearance, so that the parts 5 and 7 may shift relatively.

A spring which may be of the Belleville washer type, as indicated at 10, acts upon the member 7 and is held by a washer 11 in turn backed up by a ring 12 on the hub 2. The structure may be sealed by a sheet metal dust shield 13.

The member 5 and the member 7 are formed to provide therebetween a circumferential chamber, this chamber lying between the L-shaped formation of the member 7 and a wall of the member 5. One of the walls of the chamber, as for example the wall provided by the member 5, is inclined relative to a radial plane, as indicated at 14. Disposed in this circumferential chamber is the mechanical fluid or body of balls or shot as indicated at 15.

It will be observed that the Belleville spring packs the member 7 to the left so that the mass of balls is placed under this static spring load, and the force of the spring is delivered to the member 5, which is caused to frictionally engage the material 6, the reaction being taken by the flange 3 and hub 2. Now in this form of device, no substantial movement or flow of the mechanical fluid takes place. Before proceeding, however, with the operation of this device, a form of structure will be described wherein there is a small movement or flow of the mechanical fluid. For this purpose a clutch is illustrated.

Figure 3:
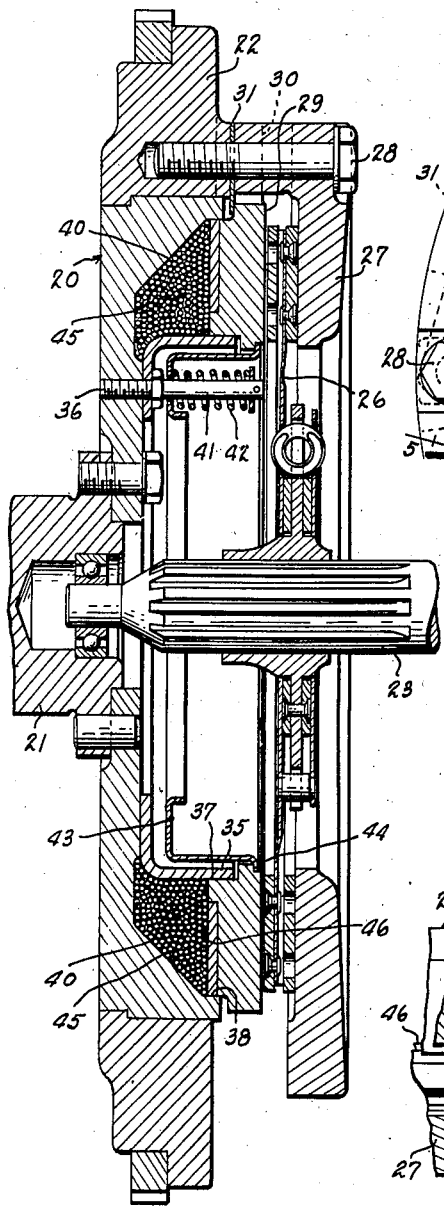
Fig. 3 is a cross sectional view of a clutch in which the invention may be used.
Figure 4:
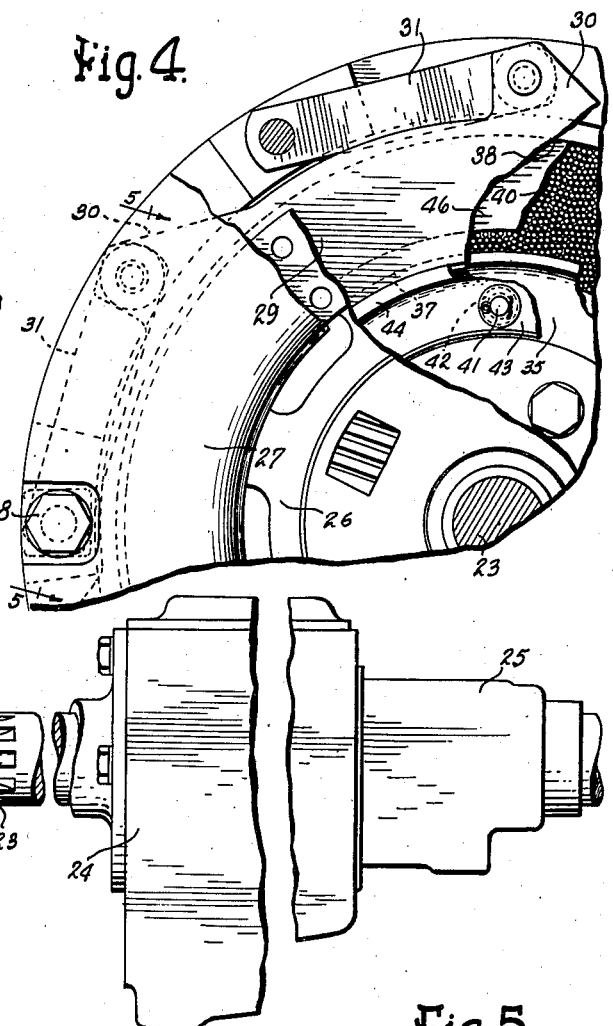
Fig. 4 is a partial end view of the clutch with parts cut away to illustrate interior structure.

The clutch illustrated in Fig. 3 takes the form of a flywheel 20 mounted upon shaft 21, the inner portion of which may be steel, for reasons which will presently appear, and having an outer or rim portion 22 which may be cast iron. A driven shaft is shown at 23 while a transmission of suitable form may be disposed within a case 24, while a free-wheeling unit is indicated at 25. The clutch, transmission and free-wheeling element, as indicated, may be employed in an automotive vehicle. The free-wheeling element is indicated because the clutch shown is one which may be used with such an arrangement.

Figure 5:
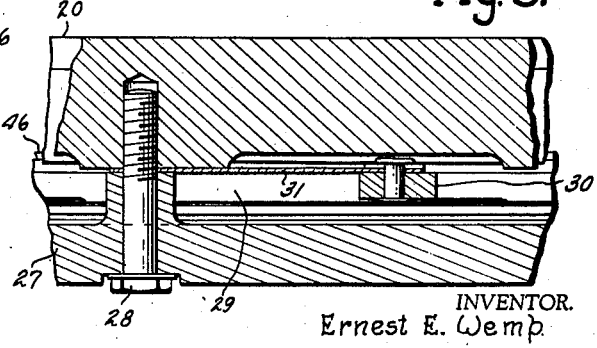
Fig. 5 is a section taken substantially on line 5—5 of Fig. 4.

Mounted on the driven shaft is a driven disc 26 having facings arranged to be engaged between a plate 27 which may be in the nature of a cover plate bolted to the flywheel as at 28, and a pressure plate 29. The pressure plate is mounted to rotate with the flywheel, and to this end may have radially extending lugs 30 lying between the flywheel and cover plate, as shown in Fig. 5, and flexible metal members 31 are riveted to the lugs 30 and secured to the flywheel by the cap screws 28, as indicated. Thus the pressure plate rotates with the flywheel through the means of the flexible tension elements 31, but these flexible members permit axial shift of the pressure plate.

A pilot for the pressure plate is shown at 35 secured to the flywheel by cap screws 36, and the pressure plate forms, in effect, a piston slidable between the pilot and a surface of the flywheel, as indicated respectively at 37 and 38. The flywheel, pressure plate and pilot are formed so as to provide a circumferential chamber in which the mechanical fluid or body of balls or shot is disposed, as indicated at 40.

The cap screws 37 may include extending studs 41, upon which springs 42 are situated, these springs being compression springs, and serving to urge a retractor plate 43 to the left as indicated; this retractor plate engaging the pressure plate as at 44.

The surface of the flywheel which defines a part of the circumferential chamber is angularly disposed as indicated at 45. The face of the pressure plate, which is positioned oppositely relative to the surface 45, may be of a hardened characteristic which may be provided by an inserted steel plate 46, while the surface 45 is hard, which is provided by forming the inner structure of the flywheel of steel. Normally, and in the absence of rotation, the retractor springs 42 shift the pressure plate to the left as indicated, thus disengaging the driven disc and placing the mechanical fluid under load.

In the operation of these structures the body of shot or balls acts in the manner of a fluid and substantially follows the law of fluid centrifugal head. Upon rotation, a centrifugal head is set up and the random arrangement of the balls creates pressures not only on radial lines but on lines other than radial so that the mass tends to spread axially, and accordingly, tends to separate the walls between which the mass is confined.

Figure 2:
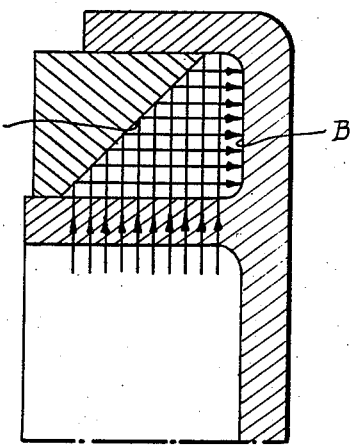
Fig. 2 is a diagrammatic view illustrating the change of direction of the forces.

It has been found by experiment that where the confining walls are perpendicular to the axis, the efficiency of the device is quite low. For example, where a mass of balls of .060 to .065 inch in diameter were used, the actual axial pressures obtained were only about 15 to 20% of the theoretical pressure which would be obtained with a frictionless fluid of the same unit weight or specific gravity. Accordingly, a direction changer is provided as by means of placing one of the confining walls on an angle. The walls 14 and 45 are thus disposed. In the diagrammatic view Fig. 2, the manner of change of direction of the forces is indicated. Here the confining walls are illustrated at A and B and the wall A is angularly disposed. This converts the radial forces into axial forces. The arrows in Fig. 2 illustrate how the radial forces are reflected from the slope and act through the medium in an axial direction to produce the axial forces, as indicated. The angularity of the direction-changing surface may be varied to meet structural requirements, but a 45° angle theoretically converts the forces into a true axial direction. This arrangement has been shown to develop an efficiency of from 90 to 98% of the theoretical results of a frictionless fluid of the same weight per cubic foot as the shot or balls. As evidence of the fact that this structure follows the law of a centrifugal head mechanism, it might be pointed out that actual axial loads at various R. P. M. have been obtained which were from 130 to 155% greater than the theoretical calculated loads of a straight centrifugal force device with centrifugal weights equal to the weight of the mass of mechanical fluid.

In a device shown in Fig. 1 there is substantially no movement or flow of the mass of material. The material is placed under load in a static condition by the spring. At low R. P. M. the pressure exerted on the friction facing 6 is low and can be calculated by the proper selection of the spring and facing material to effectively dampen out vibrations at low R. P. M. The torsional vibrations, as will be obvious, are transmitted from the shaft 1 to the plate 3, but the mass weight 5 can oscillate in a manner to dampen these vibrations, and the action is controlled by the friction. Upon increase of R. P. M., the centrifugal head exerts a packing pressure to increase the pressure on the friction facing. This pressure increases progressively with increase of R. P. M., and as a result, there is more frictional dampening action at the higher speeds. Therefore, a wide variation in frictional dampening can be obtained to combat torsion vibration periods in the crank-shaft through all of its harmonics.

In the clutch illustrated in Fig. 3, there is a certain amount of movement or flow of the centrifugal head material. When the clutch is at rest, as shown, the springs 42 may place the material under a predetermined load, and this condition may exist during rotation and up to a substantially predetermined R. P. M. Upon increase of the R. P. M. from such predetermined point, the centrifugal head increases and the pressure plate is shifted to the right and the driven disc is packed between the pressure plate 29 and plate 27 for clutch engagement. Where the clutch is used in an automotive vehicle, speed change gears may be operated by reason of the free-wheeling coupling at 25 which disconnects the shaft 23 from the propeller shaft. Upon deceleration, substantially to the predetermined speed, the clutch automatically opens as the centrifugal head lowers to the point where the retractor springs 42 function to shift the pressure plate back to the position shown.

Upon opening the clutch the inclined surface aids in the shift of the balls radially inwardly under the action of the retractor springs, and the incline surface also acts in aiding to prevent the outer layer of the balls from wedging against the outer cylinder wall.

With an arrangement of this kind, adequately high pressure plate pressures, in a clutch, can be obtained to effect a high clutch torque capacity even with a relatively small diameter. For example, the formula for the centrifugal head in a hydro-dynamic device is:

$$F = \frac{k}{2g} V^2$$

where

F is the unit pressure in lbs./sq. ft.
V is the lineal velocity in ft./sec. and measured in this case at the mean radius (in ft.) of the piston.
k is the wt. per cubic ft. of the medium or fluid used.
g is the acceleration of gravity.

The value of k for water=62.4# cu. ft. However, the weight per unit of steel shot of from .060 to .065 in diameter is about 291.5 lbs. per cubic foot. From this it will be seen that the shot in this instance had a unit weight of 4.6 times that of water. And high pressure can be obtained because the pressure varies directly with the unit weight of the substance.

Also, unit pressure varies with the lineal velocity, and the lineal velocity varies with the radius.

$$V = \frac{2\pi r N}{60}$$

where $\pi = 3.1416$.
r = radius in ft.
N = revolutions per min.

Therefore, an increase in radius results in greater lineal velocity and a much greater unit pressure because the velocity is squared.

The capacity of such a device varies as the product of two squares, and the capacity will increase very rapidly with increase in diameter. Let P equal the pressure and A the area of the piston; then P equals F (unit pressure) times A (area). Now since F varies with the square of the lineal velocity and A (the area) varies with the square of the radius, so the pressure varies with the square of the lineal velocity times the square of the radius. In addition to this a high centrifugal head pressure is developed where the mechanical fluid comprises steel or some other metal having a high specific gravity.

The arrangement is believed to be particularly useful where substantially no movement or flow or a limited movement or flow is required of the substance. It is not the intention to employ this arrangement with a substance such as the shot or balls disclosed herein where a high velocity flow of the medium is required. There can be a movement of the medium but it appears of necessity to be limited to low velocity. The action of the substance in its movement is silent and where used in the clutch the low velocity tends to prevent a sudden grabbing or quick engagement of the clutch. Devices of this type, where the shot is placed under an initial static load, can be balanced in this condition, and the balanced condition is not distributed at the higher R. P. M. Two applications of the idea have been disclosed herein, namely, an application where there is no substantial movement or flow as in the vibration dampener, and the clutch application where there is a limited movement or flow. No sealing problems are presented. The employment of shot or balls, or elements of this nature which are symmetrical in form, is preferred because of the relatively low interfacial friction, and with a random arrangement of elements of this type, the pressures can be efficiently changed in direction from the radial to a direction approximating the axial. The inclination of one of the walls does not serve to provide a mechanical advantage, but is provided only as a direction changer. The angularity of the slope can be varied, as it will be seen that in some instance where clearances and available space must be considered, different angles may provide larger or smaller effective piston areas. In calculating the capacity of such a device, the effective piston area may be measured as the projected area of the angular portion of the one wall. No attention need be given to the portion of the chamber where the walls are parallel because of the low efficiency of the arrangement with parallel walls. The portion of the chamber with parallel walls is used as a reservoir so that the angular wall and projected piston area are covered by the balls during operation.

In the accompanying claims, the terms "ball" or "balls" are used in making reference to the mass of material or medium which produces the centrifugal head. This term is to be considered broadly because it is used for convenience and brevity; the use of the term is not intended to limit the particles to a spherical shape, as some balls may be composed of a multiplicity of flat sides or may be somewhat elongated as a foot ball. The balls or shot may be used in a dry condition, or may be used in a condition moistened with a lubricant which may lessen the interfacial friction. It is also stated that the elements are of a symmetrical nature or symmetrical, and this is used in the sense that the particles are of such design that the mass has a certain fluidity without much tendency to pack together and maintain a geometrical shape.

I claim:

1. A vibration dampener for a rotary device comprising, an element mounted to rotate with the device, another element capable of relative rotary movement, means rotatable with the shaft and having a frictional engagement with the second element, said elements being arranged to form a chamber therebetween, a mass of shot within and substantially filling the chamber for exerting centrifugal head upon rotation to apply pressure on the elements and thereby vary the pressure of the frictional engagement between the second named element and said means, one of the walls of the chamber being inclined relative to a radial plane to change the direction of the centrifugal forces to substantially an axial direction.

2. A vibration dampener for a rotary shaft or the like comprising, an element mounted on the shaft to rotate therewith, a weighted element mounted for unlimited relative rotary movement, means rotatable with the shaft and arranged to have a frictional engagement with the weighted element, an annular chamber provided by and between the elements, a mass of material comprising a multiplicity of balls disposed substantially at random within and substantially filling the chamber for exerting centrifugal head upon rotation to apply pressure on the elements and vary the frictional engagement between the said means and second named element substantially in accordance with variation in the R. P. M. of the shaft, one of said walls being inclined relative to a radial line to change the direction of the forces substantially to an axial direction.

3. A vibration dampener for a rotary shaft or the like comprising, an element mounted on the shaft to rotate therewith, a weighted element mounted for unlimited relative rotary movement, said elements being capable of relative axial shift, means rotatable with the shaft and arranged to have a frictional engagement with the weighted element, an annular chamber provided by and between the elements, a mass of material comprising a multiplicity of balls disposed substantially at random within and substantially filling the chamber for exerting centrifugal head upon rotation and applying pressure on the elements to vary the frictional engagement between the said means and second named element substantially in accordance with variation in the R. P. M. of the shaft, one of said walls being inclined relative to a radial line to change the direction of the forces substantially to an axial direction.

4. A vibration dampener for a rotary shaft or the like comprising, an element mounted on the shaft to rotate therewith, a weighted element mounted for relative rotary movement, said elements being capable of relative axial shift, means rotatable with the shaft and arranged to have a frictional engagement with the weighted element, an annular chamber provided by and between the elements, a mass of material comprising a multiplicity of balls disposed substantially at random within and substantially filling the chamber for exerting centrifugal head upon rotation and applying pressure on the elements to vary the frictional engagement between the said means and second named element substantially in accordance with variation in the R. P. M. of the shaft, one of said walls being inclined relative to a radial line to change the direction of the forces substantially to an axial direction, and loading means for placing the material in the chamber under initial compression and establishing a static engagement pressure between said means and second named element.

5. A vibration dampener for a rotary device comprising, means rotatable with the device and having a friction face, a weighted element rotatably mounted on the device and having a friction face, the faces being arranged to provide frictional engagement, another element fixed to rotate with the device, said elements being shaped to provide between them a substantially closed annular chamber, a mass of material comprising a multiplicity of balls disposed at random and substantially filling the chamber for exerting centrifugal head upon rotation, one of the walls of the chamber being inclined relative to a radial plane to change the direction of forces substantially to an axial direction, whereby the forces subject the weighted element to axial load to vary the friction with the said means as the centrifugal force varies incident to variation in the speed of rotation, and means for placing the material under initial compression and establishing an initial static pressure of engagement between the said means and weighted element.

6. In a rotary pressure mechanism, two rotary elements having complemental circumferential surfaces forming a circumferential chamber, a surface of one element being inclined to the radial plane so that opposing surfaces of the two elements converge outwardly, said elements being movable relative to each other, friction means for frictional engagement with one of the elements, a mass of material having fluid properties and comprised of a multiplicity of balls substantially filling said chamber, said balls being relatively small as compared to the major dimension across the chamber whereby only some of the balls contact surfaces of the chamber and some are wholly within the mass and completely surrounded by other balls, means tending to shift the elements relatively to place the mass under static compression whereby to prevent gravitation of the balls and to maintain substantial balance of the mass while at rest and to apply frictional engagement pressure between said one element and the friction means, said mass of material exerting centrifugal head upon rotation without substantial flow thereof to increase the pressure of frictional engagement between said one element and the friction means.

7. In a rotary pressure mechanism, two rotary elements having complemental circumferential surfaces whch form a circumferential chamber, a surface of one element being inclined to the radial plane so that opposing surfaces of the two elements converge outwardly, said elements being mounted for relative rotational and axial movement, friction means for frictional engagement with one of the elements, a mass of material having fluid properties and comprised of a multiplicity of balls substantially filling said chamber, said balls being relatively small as compared to the major dimension across the chamber whereby only some of the balls make contact with surfaces of the chamber and some are wholly within the mass and completely surrounded by other balls, means tending to shift the elements axially toward each other to place the mass under static compression whereby to prevent gravitation of the balls and to maintain substantial balance of the mass in the absence of rotation and to apply frictional engagement pressure between said one element and the friction means, said mass of material exerting a centrifugal head upon rotation without substantial flow thereof to place a load axially upon the elements and increase the pressure of frictional engagement between said one element and the friction means.

8. A vibration dampener for a rotary shaft or the like, comprising an element mounted on the shaft to rotate therewith, a weighted element mounted for rotary movement relative to the first element, said elements being capable of relative axial shift, friction means rotatable with the shaft and arranged to have frictional engagement with the weighted element, said two elements having complemental surfaces forming a circumferential chamber, a surface of one element being inclined to the radial plane so that opposing surfaces of the two elements converge outwardly, a mass of material having fluid properties and comprised of a multiplicity of balls substantially filling said chamber, said balls being relatively small as compared to the major dimension across the chamber whereby only some of the balls contact surfaces of the chamber and some are wholly within the mass body and completely surrounded by other balls, means for exerting an axial force on the elements to place the mass under static compression whereby to prevent gravitation of the balls and to maintain substantial balance of the mass in the absence of rotation and to apply frictional engagement pressure between said one element and the friction means, said mass of material exerting centrifugal head upon rotation without substantial flow thereof to place an axial load on the said two elements and increase the pressure of frictional engagement between said one element and the friction means.

ERNEST E. WEMP.